June 8, 1926.

C. E. SCHENCK 1,587,736

PARAFFIN WAX SPRAYER

Filed March 24, 1924

WITNESSES

Inventor
CHARLES E. SCHENCK

By
Attorney

Patented June 8, 1926.

1,587,736

UNITED STATES PATENT OFFICE.

CHARLES E. SCHENCK, OF CLEARWATER, FLORIDA.

PARAFFIN-WAX SPRAYER.

Application filed March 24, 1924. Serial No. 701,528.

This invention appertains to novel appliances for spraying citrus fruit and vegetables with wax to form a protecting coat therefor, and the primary objects of the invention are first, to provide novel means for heating the wax to a liquid consistency; second, novel means for supplying heated compressed air to the outlet pipe for the wax for causing the atomizing thereof and the forcing thereof under pressure on the fruit or vegetables to be sprayed; and third, to provide novel means for controlling the heating of the wax and the said compressed air.

A further object of the invention is to provide novel means for arranging the heater for the compressed air and the wax in a suitable container, whereby the highest efficiency will be had from said heater.

A further object of the invention is the provision of novel means for arranging the outlet end of the compressed air pipe relative to the intake end of the wax spraying pipe, whereby the liquid wad will be forcibly drawn into said wax pipe under pressure and atomized therein.

A still further object of the invention is to provide an improved device of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1:
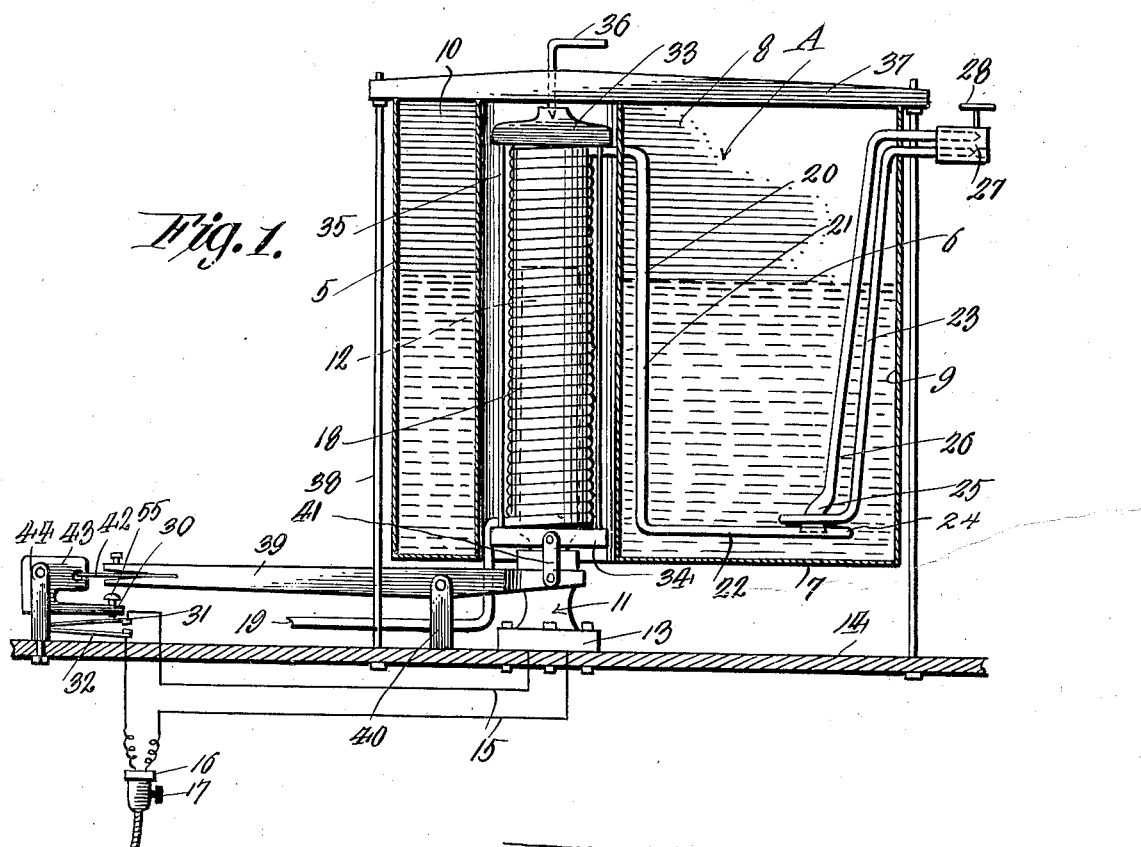
Figure 1 is a longitudinal section through the improved device illustrating the arrangement of the heater, the compressed air pipe and wax outlet pipe in the wax containing tank and arranged with these elements to one another.
Figure 4:
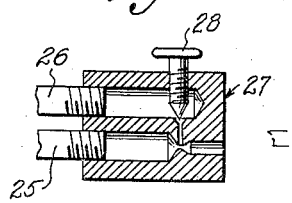
Figure 4 is a longitudinal section through the nozzle.
Figure 2:
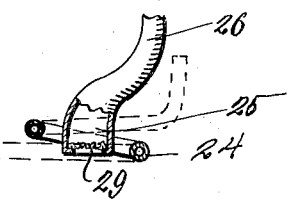
Figure 2 is a detail section illustrating the arrangement of the compressed air pipe to the intake end of the wax spraying pipe.
Figure 3:
Figure 3 is a detail bottom plan view of the intake end of the wax spraying pipe.

Referring to the drawings in detail, wherein similar reference characters designate corresponding parts throughout the several views, the letter A generally indicates the improved device which comprises a tank 5 of adequate size for receiving the paraffin 6 which is to be sprayed on the citrus fruit or vegetables. This tank 5 can be formed of any desired material, such as metal or the like and includes the bottom wall 7, the side walls 8 and the end walls 9.

A vertically disposed flue 10 is arranged within the tank 5 adjacent to one end thereof and arranged within the flue is a heater 11, which is preferably of the electric type. As shown this heater 11 includes a heating portion 12 and a base 13 which rests directly upon a suitable support 14. The electric heater 11 has connected thereto in any desirable way the electric lead wires 15 which have interposed therein a suitable control switch mechanism, which is adapted to be automatically opened and closed by means, which will be hereinafter more fully described. The terminals of the lead wires 15 are connected to a suitable plug which is adapted to be fitted in an outlet socket. The outlet socket can be provided with any desired type of manually controlled switch 17.

Coiled about the heater portion 12 or the electric heater 11 is a hot-air coil 18 the lower end of which has connected thereto a compressed air feed pipe 19 which can lead from the outlet end of an air compressor or other suitable source of supply. The upper end of the said hot-air coil has connected thereto a U-shaped feed hot-air pipe 20 which is wholly immersed within the paraffin 6. This U-shaped hot-air feed pipe 20 includes a relatively long leg 21, a horizontally disposed connecting body portion 22, and an inclined leg 23. The inclined leg 23 and connecting portion 22 are provided with a coil 24 which extends about the flared inlet end 25 of the paraffin feed pipe 26 which is of a substantially inverted L-shape. One leg of the inverted L-shaped paraffin feed pipe 26 extends through one end wall 9 of the tank and is provided with a spraying nozzle 27. The flow of paraffin through the nozzle can be controlled by a suitable hand valve 28. The flared inlet 25 of the paraffin feed pipe 26 has disposed therein a suitable screen 29 which functions as means for preventing the entrance of foreign objects into the pipe 26. The upper end of the hot-air pipe 23 extends into the feed nozzle 27 and it can be seen that the air flowing through the nozzle under pressure will suck the paraffin into the same and spray the same over the fruit.

The means for breaking the circuit to the lead wires 15 and the heater 11 for controlling the heat of the paraffin embodies a switch 30 interposed within the wires which includes a pair of resilient arms 32 carrying contact points 31. It can be seen that when the contact points 31 are separated that the current is broken through the heater. The upper end of the coil 18 has resting thereon a cap 33 which is slidably mounted on suitable guide rods 35 carried by a movable platform 34 upon which normally rests the lower end of the coil 18. The cap 33 is adapted to be held in place and adjusted to the desired tension by means of a hand screw 36 which is carried by a cross bar 37. This cross bar 37 is in turn held in position by rods 38 carried by the base or support 14. A double ended lever 39 is pivoted at a point intermediate its end upon a suitable bracket 40 and the inner end of the lever is connected to the platform 34 by a suitable link 41. The outer end of the lever 39 carries a resilient plate 42 which is connected to a swinging lever 43 pivoted to the bracket 44. This lever 43 is adapted to normally engage the pair of resilient arms 32 and it is obvious that when the coil becomes heated, that the same will expand thus pressing down on the inner end of the lever 39 and raising up on the outer end of the lever 39 which will move the lever 43 upward and engage the pair of resilient arms 32 allowing the circuit to be broken through the feed wires 15 thus cutting out the operation of the heater. When the paraffin becomes cooled to a predetermined point the coil will contract which will permit downward movement of the outer end of the lever and the consequent bringing of the contacts 31 into engagement with one another which will start the electric heater again in operation. A stud set screw 55 is carried by the end of the lever 43 for engaging one of the arms 32 so as to adjust the position of the lever relative to the arm.

In use of the improved appliance, the current is allowed to flow through the electric heater 11 by actuating the switch 17 which will effectively heat the compressed air flowing through the coil 18 and the paraffin 6 in the tank 5. The heated compressed air will flow into a spraying nozzle 27 and effectively suck the paraffin into the pipe 26. The compressed air functions as means for carrying the paraffin into the pipe and for spraying the paraffin onto the fruit. After the paraffin reaches a predetermined temperature the coil 18 will expand which will force down the platform 34 and raise the outer end of the lever 39 which will allow the resilient arms 32 to spread apart thus breaking the circuit through the contact points 31. Thus it can be seen that the paraffin is kept at a normally predetermined temperature.

While I have stated that this machine is particularly adapted for spraying paraffin, it is to be understood that the same can be used for spraying any substance, such as rosin or any material of that kind that takes to liquefying it to permit the atomizing thereof.

Changes in details may be made without departing from the spirit or the scope of this invention, but

What I claim as new is:

1. A device for spraying paraffin comprising a tank for receiving paraffin, a pipe for spraying paraffin having one end immersed in the paraffin, a spraying nozzle carried by the opposite end of the pipe, means for controlling the flow of paraffin through the nozzle, an intake head carried by the lower end of the paraffin spraying pipe, a screen arranged in said head, a vertical flue extending through the tank, a heater in the flue, a pipe for air coiled about said heater, a feed pipe for compressed air connected with one end of the coil, a substantially U-shaped pipe immersed in the paraffin and having one end connected with the outlet end of the coil and its opposite end connected with the spraying nozzle, a part of the U-shaped pipe being coiled about the intake head, and means for controlling the current flowing through the heater.

2. A device for spraying paraffin comprising a tank for receiving paraffin, a pipe for spraying paraffin having one end immersed in the paraffin, a spraying nozzle carried by the opposite end of the pipe, a vertical flue extending through the tank and adjacent to one end thereof, a pipe for air coiled about the axis of the flue and arranged within the flue, a heater for the tank and pipe for air disposed directly within the flue and the coiled air pipe, a feed pipe for compressed air connected with one end of the coil, a discharge pipe for hot compressed air immersed in the paraffin at one side of the heater and communicating with the outlet end of the coil and its opposite end with the spraying nozzle and having a coil formed in the hot compressed air discharge pipe disposed about the intake end of the paraffin spraying pipe.

3. A device for spraying paraffin comprising a tank for receiving paraffin, a pipe for spraying paraffin having its intake end immersed in the paraffin, a vertical flue extending directly through the tank at one side of the paraffin spraying pipe, an electric heater arranged in the flue, a pipe for compressed air coiled about said electric heater and having a portion thereof immersed in the tank and disposed in close relation to the intake end of the pipe for spraying paraffin, and a spraying nozzle connected with the outlet end of the spraying pipe and the air pipe.

4. A spraying device comprising a tank for receiving the material to be sprayed, a pipe for the material to be sprayed having its intake end immersed in the material, a flue extending through the tank, a heater arranged in the flue, a pipe for a fluid under pressure arranged in the flue adjacent to the heater and having a portion thereof immersed in the material to be sprayed, and a spraying nozzle connected with the outlet end of the pipe for the material and the pipe for the fluid under pressure.

In testimony whereof I affix my signature.

CHARLES E. SCHENCK.